United States Patent [19]

Janssen et al.

[11] Patent Number: 5,659,279

[45] Date of Patent: Aug. 19, 1997

[54] MAGNETIZER HOLDING FIXTURE

[75] Inventors: David C. Janssen, Whitefish Bay; Eric J. Neusen, Brown Deer, both of Wis.

[73] Assignee: Strattec Security Corp., Milwaukee, Wis.

[21] Appl. No.: 521,034

[22] Filed: Aug. 29, 1995

[51] Int. Cl.⁶ ................................................. H01F 7/20
[52] U.S. Cl. ................................. 335/284; 70/275
[58] Field of Search ..................... 335/284; 324/208, 324/252; 70/275, 276

[56] References Cited

U.S. PATENT DOCUMENTS

| | | |
|---|---|---|
| 2,897,417 | 7/1959 | MacDonough et al. . |
| 3,219,889 | 11/1965 | Polushkin . |
| 3,417,295 | 12/1968 | Littwin . |
| 3,488,575 | 1/1970 | McIntire et al. . |
| 4,549,157 | 10/1985 | Loubier . |
| 4,682,137 | 7/1987 | Kasza et al. . |
| 4,779,069 | 10/1988 | Brown . |
| 4,791,365 | 12/1988 | Johannes et al. ............ 324/208 |
| 5,097,239 | 3/1992 | Wagner et al. . |
| 5,117,183 | 5/1992 | Santos . |
| 5,167,214 | 12/1992 | deRonde ..................... 123/617 |

*Primary Examiner*—Lincoln Donovan
*Attorney, Agent, or Firm*—Andrus, Sceales, Starke & Sawmill

[57] ABSTRACT

A device and method are provided for magnetizing a control magnet housed in a cylinder of an ignition lock. The cylinder is placed in a cylinder receipt member and orientated therein so that the magnet is aligned in a predetermined position. The control magnet is then saturated with a first saturating magnetic charge. The control magnet is then calibrated to a predetermined magnetic level by one or more calibrating magnetic charges, opposite in polarity to the saturating magnetic charge. The control magnet may then be checked for predetermined magnetic characteristics.

22 Claims, 2 Drawing Sheets

MAGNETIZER HOLDING FIXTURE

The invention relates to locks, and more particularly, to a method and apparatus for magnetizing a control magnet in a cylinder lock.

For the last several years, it has become increasingly desirable to improve the anti-tampering features of lock and key sets. This is especially true with respect to automobile ignition systems where auto theft has almost developed into an art form. Skilled thieves can often "hot wire" an automobile ignition in a matter of a few seconds. Typically, the key and cylinder lock for engaging and energizing the ignition system is either bypassed or pulled in order to facilitate the theft.

To combat this increase in auto theft, automobile manufacturers have incorporated a variety of vehicular anti-tampering systems (VATS) to make vehicle theft more difficult. Numerous of these electrical or electronic locks work in cooperation with mechanical lock systems. For example, the ignition lock may include a Hall effect sensor element which is activated by a control magnet on the cylinder member of the lock. The Hall effect sensor undergoes a change of state at the leading and trailing edge of the control magnet during clockwise rotation. An additional change of state is provided as the magnet returns in the counterclockwise direction. These changes of states are required to occur at specific angles in order to enable the ignition circuit to start an automobile. Therefore, it is highly desirable to accurately calibrate the control magnet in order to reduce the tolerance band of the state changes of the Hall effect sensor element.

Therefore, it is a primary object and feature of the invention to provide a method and apparatus for magnetizing a control magnet for a cylinder lock.

It is a further object and feature of the present invention to provide a method and apparatus for accurately magnetizing of a control magnet for use in conjunction with a cylinder lock.

A device and method for magnetizing a control magnet within a cylinder of an ignition lock to a predetermined magnetization value is provided. The device includes a cylinder receipt member having a socket extending along a longitudinal axis for receiving the cylinder therein. The cylinder receipt member includes a first positioning member biased in a first direction perpendicular to the longitudinal axis and toward the interior of the socket. The first positioning member acts as a datum to engage the flat side of a tab on the cylinder when the cylinder is received in the socket so as to prevent rotational movement of the cylinder in the socket.

The cylinder receipt member further includes a second positioning member movable between a first retracted position and a second extended position. When in the second extended position, the second positioning member engages the cylinder when the cylinder is received within the socket so as to align the control magnet for magnetization.

The cylinder receipt member is movable between a first position wherein the cylinder may be inserted or removed from the socket, a second magnetization position wherein the control magnet is saturized with a magnetic charge, and a third calibration position wherein the control magnet is calibrated to a predetermined magnetic value.

When the cylinder receipt member is moved from the first position to the second magnetization position, a magnetization coil surrounds the cylinder receipt member. A current is provided through the magnetization coil so as to generate a magnetic field to saturate the control magnet. The cylinder receipt member is then moved to the third calibration position wherein a calibration coil surrounds the cylinder receipt member. A current is provided in the calibration coil to generate a magnetic field opposite in polarity to the magnetic field generated by the magnetization coil to, in turn, calibrate the magnet. The cylinder receipt member is then returned to the first position and the cylinder is removed from the socket.

BRIEF DESCRIPTION OF THE PREFERRED EMBODIMENT

DETAILED DESCRIPTION OF THE PREFERRED EMBODIMENT

Figure 2:
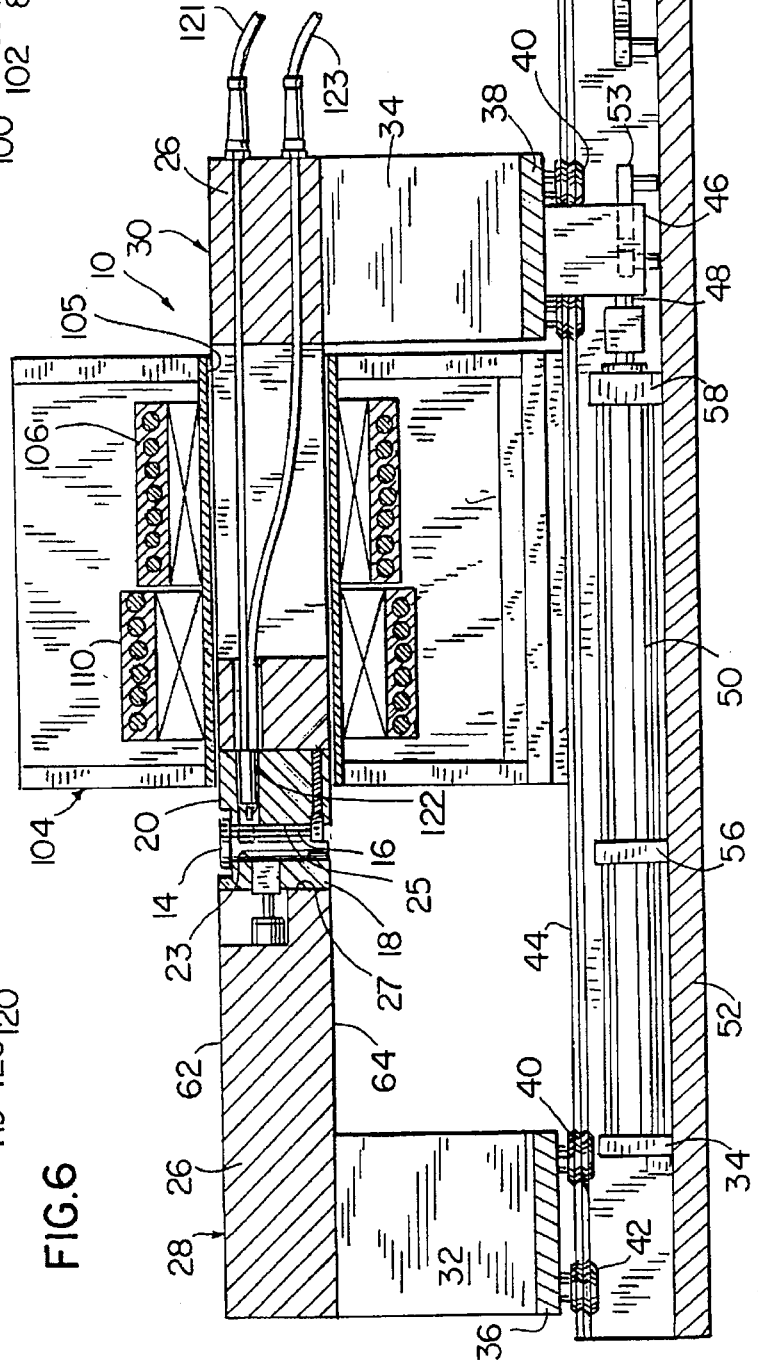
FIG. 2 is a side elevational view, partially in section, showing a magnetizer holding fixture of the present invention.

Referring to FIG. 2, the magnetizer holding fixture of the present invention is generally designated by the reference numeral 10. The magnetizer holding fixture magnetizes a control magnet 12, FIG. 5, supported in the cylinder 14 of a conventional cylinder lock.

Figure 1:
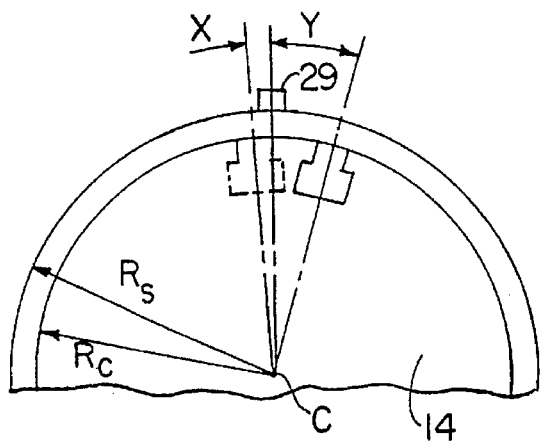
FIG. 1 is a diagrammatic view of portion of a cylinder lock incorporating a control magnet and a Hall effect sensor element.
Figure 1A:
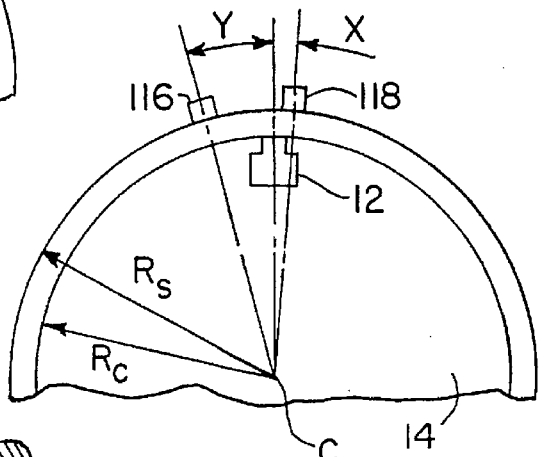
FIG. 1a is a diagrammatic illustration of a portion of a cylinder incorporating a control magnet, the cylinder received within a magnetizer holding fixture corresponding to the present invention.
Figure 4:
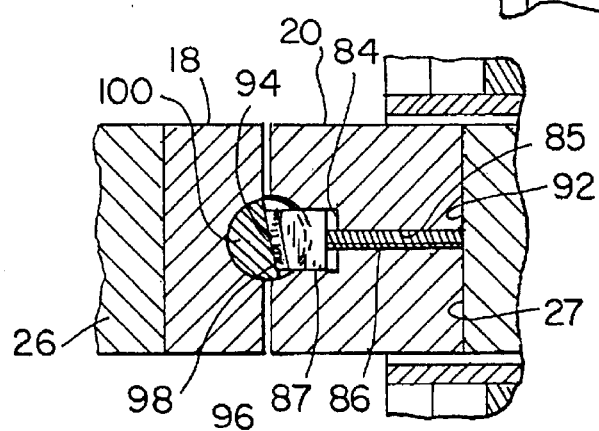
FIG. 4 is a cross-sectional view of the magnetizer holding fixture of FIG. 3 taken along line 5—5.

Holding fixture 10 includes a socket 16 for receiving cylinder 14 having a predetermined diameter $R_c$. FIGS. 1–1a, therein. Socket 16 is generally oblong in shape and is defined by a pair of cooperating block members 18 and 20, FIGS. 4–5. Each block member 18, 20 including a concave groove 22 and 24, respectively, cooperate to define socket 16 for receipt of cylinder 14. Each concave groove 22, 24 is defined by an arcuate concave sidewall 23 and 25, respectively, on block members 18 and 20.

Block members 18, 20 are received within an opening 27 in a table 26. Table 26 has first 28 and second 30 opposite ends. Each end 28, 30 of table 26 includes a support legs 32 and 34, respectively, depending therefrom. Each support leg 32, 34 includes a bogie 36 and 38, respectively, mounted thereto to facilitate lateral movement of table 26, as hereinafter described.

Each bogie 36, 38 includes a pair of forward, spaced flange wheels 40, and a pair of rearward spaced flanged wheels 42, such that one of the forward wheels 40 and one of the rearward flanged wheels 42 of each bogie 36, 38 ride on a first track 44, and the second of the forward flanged wheels 40 and the second of the rearward flanged wheels 42 of each bogie 36, 38 ride on a second track (not pictured).

A member 46 depends from bogie 38 and is interconnected to the shaft 48 of a pneumatic actuator 50. Hydraulic cylinder 50 is secured to a horizontal platform 52 by a series of spaced holding brackets 54, 56 and 58. First, second and third proximity switches 53, 55, and 57, respectively, are attached to platform 52 and control the lateral movement of shaft 48, for reasons hereinafter described.

Figure 5:
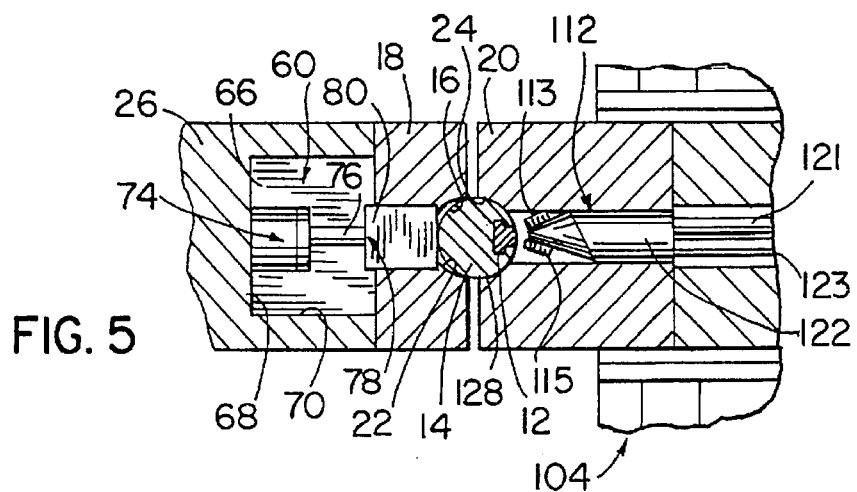
Figure 3:
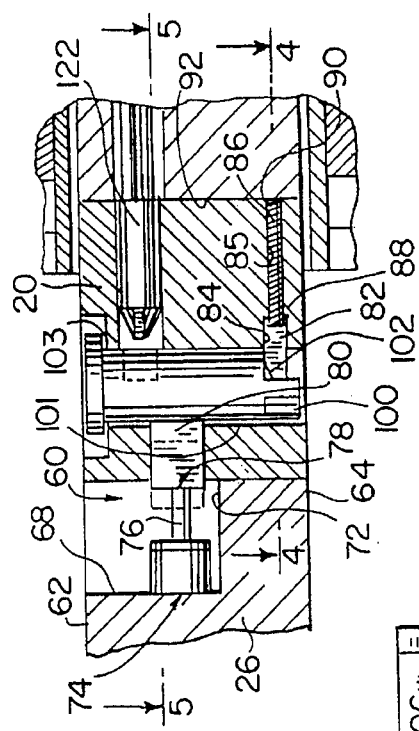
FIG. 3 is an enlarged side elevational view of a portion of the magnetizer holding fixture of FIG. 2; magnetizer holding fixture of FIG. 3 taken along line 4—4.

As best seen in FIGS. 3, 5, table 26 includes a generally rectangular recess 60 extending from the top surface 62 toward the bottom surface 64 of table 26. The recess 60 is defined by side walls 66, 68 and 70, and shoulder 72. An air cylinder 74 extends from side wall 68 in recess 60. Air cylinder 74 includes a shaft 76 having a first end 78 mounted to a first positioning member 80 for engaging and positioning cylinder 14, as hereinafter described.

A second positioning member 82 is partially received in a cavity 84 in blocking member 20 and partially extends into socket 16. A spring passage 85 extends through block 20 and communicates with socket 16. A spring 86 is positioned in spring passage 85 such that a first end 88 of spring 86 engages the second positioning member 82 and a second end 90 of spring 86 engages side wall 92 in table 26 so as to bias the second positioning member 82 toward the interior of socket 16. A pneumatic cylinder (not shown) may be used to retract second positioning member 82 out of socket 16 to allow easier insertion of cylinder 14 into socket 16.

Second positioning member 82 includes an angled cylinder engaging surface 94. The angle of the cylinder engaging surface 94 of the second positioning member 82 corresponds to the angled surface 98 on tab 100 depending from the lower surface 102 of cylinder 14. When cylinder 14 is received within socket 16, cylinder engaging surface 94 engages the angled surface 98 of tab 100 so as to prevent rotation of cylinder 14 in socket 16. In addition, as second positioning member 82 engages tab 100 of cylinder 114, the spring force of spring 86 urges the edge 101 of the lower surface of cylinder 14 against the arcuate concave sidewall 23 in block member 18. The arcuate concave sidewall 23 acts as a datum to preliminarily center cylinder 14 within socket 16. Similarly, the outer surface 103 on the opposite side of cylinder 14 engages arcuate concave sidewall 25 in block member 20. Arcuate concave sidewall 25 acts as a further datum to center cylinder 14 within socket 16.

In order to magnetize control magnet 12 within cylinder 14, a magnetizing chamber 104 is used. Magnetizing chamber 104 includes an opening 105 to allow table 26 to slide horizontally therein. Magnetizing chamber 104 further includes a first magnetization coil 106 which receives a current therethrough, and, in response, generates a magnetic field to saturate or fully charge the control magnet 12 with a saturating magnetic pulse. Magnetizing chamber 104 also includes a second calibration coil 110 which also receives a current therethrough and, in response, generates a magnetic field which calibrates the control magnet 12 by a series of small magnet pulses of the opposite polarity to the saturation pulse until calibration is reached.

Figure 6:
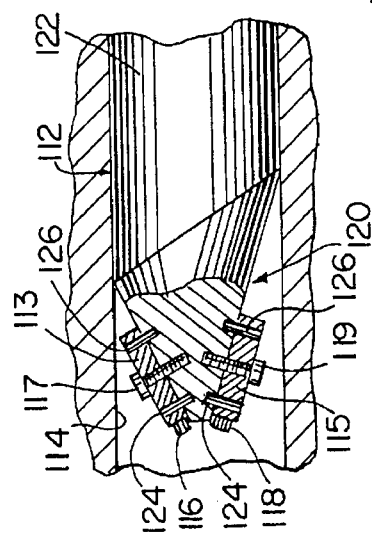
FIG. 6 is a top plan view, partially in section, showing a portion of the magnetizer holding fixture of FIG. 5.

Block member 20 further includes therein a sensor assembly 112, FIG. 6, positioned in a chamber 114. Sensor assembly 112 includes a pair of Hall effect sensors 116 and 118 glued to brass carriers 113 and 115, respectively, which, in turn, are mounted with bolts 117 and 119, respectively to the tip 120 of a sensor support 122. Each Hall effect sensor 116 and 118 are electrically connected to a circuit by wires 121, 123, FIG. 2, which reads each Hall effect sensor 116, 118 to determine if the magnetization value of control magnet 12 is within a predetermined tolerance band, as described hereinafter. Dowels 124 and 126 extend through each brass carrier 113, 115 into the tip 120 of sensor support 122, in order to align the brass carriers 113, 115, and hence the Hall effect sensors 116, 118 on the sensor support 122, for reasons hereinafter described.

As fully described in the Janssen U.S. Pat. No. 5,202,580, issued on Apr. 13, 1993, assigned to Strattec Security Corporation and incorporated herein by reference, an ignition lock may include a Hall effect sensor element which is activated by a control magnet on the cylinder member of the lock. Referring to FIG. 1, the Hall effect sensor 129 undergoes a change of state at the leading and trailing edge of the control magnet during clockwise rotation. An additional change of state is provided as the control magnet turns in the counter-clockwise direction. These changes of state are required to occur at specific angles, namely X and Y, in order to enable the ignition circuit to start an automobile.

In order to accurately calibrate the control magnet 12 in a cylinder 14, cylinder 14 is positioned within socket 16 such that first positioning member 82 engages the angled surface 98 of the tab portion 100 of cylinder 14. As previously described, this, in turn, prevents rotation of cylinder 14 within socket 16 and preliminarily centers and aligns cylinder 14 in socket 16.

Further, as best seen in FIG. 5, when cylinder 14 is received within socket 16, air cylinder 74 is actuated such that first positioning member 80 engages the outer surface 128 of cylinder 14 and urges cylinder 14 against arcuate concave sidewall 25 in block member 20 which acts as a datum to control cylinder 14 in socket 16 and to ensure the distance $R_s$ between the center C of cylinder 14 and Hall effect sensors 116 and 118 is equal to the distance $R_s$, FIG. 1, between the center of cylinder 14 and the Hall effect sensor 129 in the sleeve of a standard ignition lock.

The alignment of control magnet 12 with respect to Hall effect sensors 116 and 118 ensures that the angle X between the leading edge of control magnet 12 and Hall effect sensor 118 is equal to the angle X at which the Hall effect sensor 129 in an ignition lock is required to change state, and ensures that the angle Y between control magnet 12 and Hall effect sensor 116 is equal to the angle Y at which Hall effect sensor 129 in an ignition lock undergoes a change of state during counter-clockwise rotation.

Pneumatic actuator 50 is then actuated so as to slide table 26 along first track 44 and second track (not pictured) into opening 105 in magnetizing chamber 104 until member 46 trips proximity switch 57 thereby positioning cylinder 14 within magnetization coil 106. A current is provided through magnetization coil 106 which generates a magnetic field to saturate and fully charge the control magnet 12.

After saturating control magnet 12, Hall effect sensor 116 is read in order to ensure the control magnet 12 has reached a minimum saturation level. If control magnet 12 has not reached a minimum saturation level, the cylinder 14 is rejected, and a new cylinder is placed in socket 16 in order for the process to be repeated.

Thereafter, if control magnet 12 reaches minimum saturation level, pneumatic actuator 50 retracts shaft 48 until member 46 trips proximity switch 55 so as to place cylinder 14 fully within calibration coil 110. A current is provided in calibration coil 110 such that a series of small magnetic pulses, opposite in polarity to the saturation pulse, are generated to calibrate the control magnet 12. Each magnetic pulse reduces the magnetization valve of control magnet 12 until the control magnet 12 has a magnetization equal to a predetermined Gauss level.

After each magnetic pulse generated by the calibration coil 110, Hall effect sensor 116 is read to determine whether the magnetization value of control magnet 12 falls within a predetermined tolerance band. If the magnetization value of control magnet 12 is greater than the predetermined tolerance band, an additional magnetic pulse is generated by calibration coil 118 and the Hall effect sensor 116 is once again read to determine whether the magnetization value of control magnet 12 falls within the predetermined tolerance band. If, after a magnet pulse from calibration coil 110, the magnetization value of control magnet 12 is less than the predetermined tolerance band, table 26 is returned to its second, magnetization position to remagnetize and saturate control magnet 12, as previously described. Thereafter, the calibration process is repeated. If, after a magnetic pulse from calibration coil 110, the magnetization value of control magnet 12 falls within the predetermined tolerance band, the control magnet 12 has been preliminarily calibrated.

Once control magnet 12 has been preliminarily calibrated, Hall effect sensor 118 is read to ensure the magnetization value of control magnet 12 falls within a second predetermined tolerance band. If the magnetization value of control magnet 12 does not fall within the second predetermined tolerance band, cylinder 14 is rejected and a new cylinder is placed in socket 16 in order to repeat the process. On the other hand, if the magnetization value of control magnet 12 falls within the second predetermined tolerance band, the control magnet 12 is deemed calibrated.

After control magnet 12 is calibrated, shaft 48 of pneumatic actuator 50 is retracted until member 46 trips proximity switch 53 thereby returning table 26 to its original, first position. Cylinder 14 may then be removed from socket 16 and inserted into the sleeve of an ignition lock, as is conventional. A new cylinder may be placed in socket 16 and the process repeated.

As described, the method of the present invention not only encompasses magnetizing and calibrating a control magnet for an ignition lock, but also includes the magnetizing and calibrating of any magnet.

As such, various modes of carrying out the invention are contemplated as being within the scope of the following claims, particularly in pointing out and distinctly claiming the subject matter regarded as the invention.

I claim:

1. A fixture for holding a cylinder including a control magnet therein to be magnetized to a predetermined value, the cylinder having a forward end and a rearward end, the rearward end including a tab extending therefrom and having a flat side thereon, comprising:

a cylinder receipt member having a socket extending along a longitudinal axis for receiving the cylinder therein, the cylinder receipt member including a first positioning member engaging the cylinder when the cylinder is received within the socket so as to prevent rotational movement of the cylinder in the socket, and the cylinder receipt member further including a second positioning member movable between a first retracted position and a second extended position wherein the second positioning member engages the cylinder when the cylinder is received within the socket so as to align the control magnet for magnetization.

2. The fixture of claim 1 wherein the first positioning member includes a surface which engages the flat side of the tab of the cylinder, the surface lying in a plane parallel to the longitudinal axis.

3. The fixture of claim 2 wherein the first positioning member is biased in a first direction perpendicular to the longitudinal axis and toward the interior of the socket.

4. The fixture of claim 3 wherein the surface of the first positioning member is not perpendicular to the first direction.

5. The fixture of claim 1 wherein the socket is generally oblong in shape in a cross section perpendicular to the longitudinal axis.

6. The fixture of claim 1 wherein the cylinder receipt member includes first and second portions, each portion including a concave recess therein, the recesses cooperating with each other to define the socket for receiving the cylinder therein.

7. A device for magnetizing a control magnet within a cylinder to a predetermined value, the cylinder having a forward end and a rearward end, the rearward end including a tab extending therefrom and having a flat side, comprising:

a cylinder receipt member having a socket extending along the longitudinal axis for receiving the cylinder therein, the cylinder receipt member movable between a first position, and a second magnetization position; and a magnetizing coil for magnetizing the control magnet in the cylinder, the magnetizing coil positioned about the cylinder receipt member when the cylinder receipt member is in the magnetizing position.

8. The device of claim 7 wherein the cylinder receipt member includes a first positioning member biased in a direction perpendicular to the longitudinal axis and toward the interior of the socket, the first positioning member engaging the flat side of the tab of the cylinder when the cylinder is received within the socket so as to prevent rotational movement of the cylinder in the socket.

9. The device of claim 8 wherein the cylinder receipt member includes a second positioning member movable between a first retracted position and a second extended position wherein the second positioning member engages the cylinder when the cylinder is received within the socket so as to align the control magnet for magnetization.

10. The device of claim 7 wherein the socket is generally oblong in shape in a cross section perpendicular to the longitudinal axis.

11. The device of claim 7 wherein the cylinder receipt member includes first and second portions, each portion including a concave recess therein, the recesses cooperating with each other to define the socket for receiving the cylinder therein.

12. The device of claim 7 wherein the cylinder receipt member is movable between a first position, a second magnetization position, and a third calibration position.

13. The device of claim 12 further comprising a calibration coil for calibrating the control magnet in the cylinder, the calibration coil positioned about the cylinder receipt member when the cylinder receipt member is in the third calibration position.

14. The device of claim 7 further comprising a means for reading the magnetization value of the control magnet and for determining whether the magnetization value of the control magnet is equal to the predetermined value.

15. The device of claim 14 wherein the reading and determining means includes first and second Hall effect sensors supported within the cylinder receipt member.

16. A method of magnetizing a control magnet in a cylinder to a predetermined magnetization value, comprising the steps of:

placing the cylinder in a cylinder receipt member;

orientating the magnet to a predetermined position;

saturating the control magnet with a first saturating magnetic charge; and calibrating a control magnet to a predetermined magnetic value with one or more calibrating magnetic charges, opposite in plurality to the saturating magnetic charge.

17. The method of claim 16 further comprising the additional step of monitoring the control magnet for predetermined characteristics.

18. The method of claim 16 further comprising the additional step of removing the cylinder from the cylinder receipt member.

19. The method of claim 16 further comprising the step of positioning the cylinder receipt member within a magnetization coil before the step of saturating the control magnet.

20. The method of claim 19 wherein the step of saturating the control magnet includes providing a current through the magnetization coil so as to generate a magnetic field to saturate the control magnet.

21. The method of claim 20 comprising the additional step of positioning the cylinder receipt member within a calibration coil after the step of saturating the control magnet.

22. The method of claim 21 wherein the step of calibrating the control magnet includes providing a current through the calibration coil to generate a magnetic field opposite in polarity to the magnetic field generated by the magnetization coil.

* * * * *

UNITED STATES PATENT AND TRADEMARK OFFICE
CERTIFICATE OF CORRECTION

PATENT NO. : 5,659,279
DATED : August 19, 1997
INVENTOR(S) : Janssen et al.

It is certified that error appears in the above-identified patent and that said Letters Patent is hereby corrected as shown below:

Column 2, Lines 23-24: omit "magnetizer holding fixture of
    FIG. 3 taken along line 4-4;"
Column 2, Line 26: omit "5-5; and" insert -- 4-4; --
Column 2, Line 27: insert -- FIG.5 is a cross-sectional view
    of the magnetizer holding fixture of FIG. 3 taken along
    line 5-5; and --

Signed and Sealed this

Second Day of June, 1998

Attest:

BRUCE LEHMAN

Attesting Officer

Commissioner of Patents and Trademarks